Oct. 18, 1955    I. C. SANDBACK    2,720,816
COOKE TRIPLET TYPE OPTICAL OBJECTIVE
Filed Nov. 16, 1953

*INVENTOR.*
IRVING C. SANDBACK
BY
*Robert F. Mielke*
ATTY.

United States Patent Office 2,720,816
Patented Oct. 18, 1955

2,720,816

COOKE TRIPLET TYPE OPTICAL OBJECTIVE

Irving C. Sandback, Lincolnwood, Ill., assignor to Bell & Howell Company, Chicago, Ill., a corporation of Illinois Application November 16, 1953, Serial No. 392,275

10 Claims. (Cl. 88—57)

My invention relates to optical objectives of the Cooke triplet type which, as it is conventionally designed, is susceptible to zonal spherical aberration, zonal astigmatism and oblique spherical aberration for medium field angles, which become more pronounced as the aperture is increased.

Objects of my invention reside in the provision of an objective of the Cooke triplet type which is corrected for spherical and chromatic aberration, coma, astigmatism, field curvature and distortion, and particularly with respect to zonal spherical aberration, zonal astigmatism and oblique spherical aberration for medium field angles.

It is to be understood that the terms "front" and "rear" as herein used refer to the ends of the objective respectively nearer the longer and shorter conjugates thereof.

Figure 1:
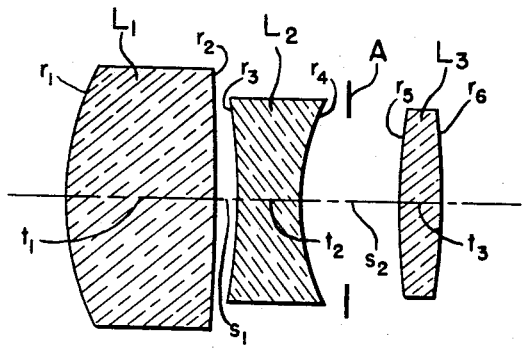
Figure 2:
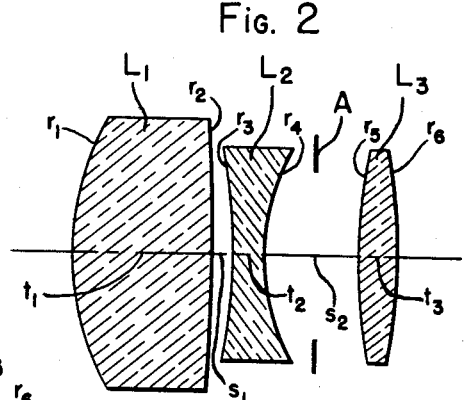
Figure 3:
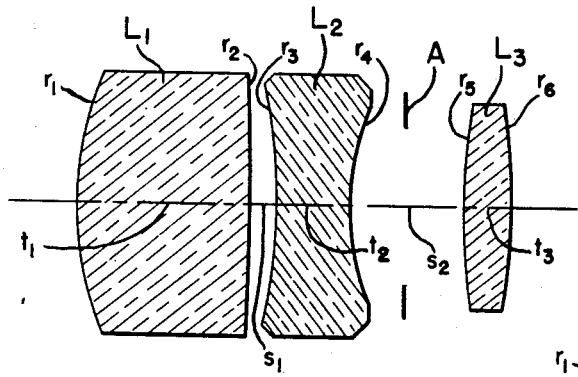
Figure 4:
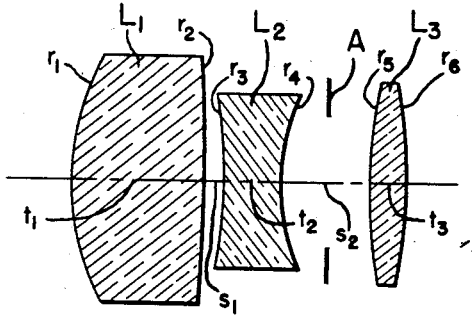
Figure 5:
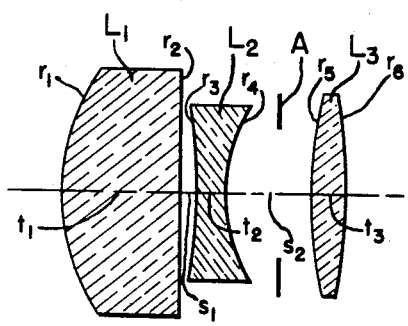

In the accompanying drawing forming a part hereof, Figures 1, 2, 3, 4 and 5 respectively illustrate Examples 1, 2, 3, 4 and 5 described herein of different objectives embodying my invention, and referring thereto each of the objectives comprises three air spaced simple components of which the front and rear components, respectively designated at $L_1$ and $L_3$, are positive, and the middle component, designated at $L_2$, is negative, and preferably as shown, in each of the Examples 1 to 4 inclusive both of the positive components are biconvex and the negative component is biconcave and in Example 5 the front positive component is plano-convex, the negative component is biconcave and the rear positive component is biconvex. Beginning with the front end of each objective, $r_1$ to $r_6$ respectively designate the optical surfaces of the components, $t_1$ to $t_3$ the axial thicknesses of the components, $s_1$ and $s_2$ the axial separations of the components, and A designates the aperture stop or diaphragm which is located, as is conventional, between the middle and rear components of the objective.

The herein Examples 1, 2, 3, 4 and 5 of the invention respectively conform with the following tables in which dimensions are in terms of inches, and in which the indices of refraction for the D line and the Abbe dispersion numbers are respectively designated at $n_d$ and V:

EXAMPLE 1

[Equivalent focal length 3    Aperture f/2.8]

| | | | | |
|---|---|---|---|---|
| $L_1$ | $r_1=+1.266$ | $t_1=.662$ | $n_d=1.6934$ | V=53.5 |
| | $r_2=-8.506$ | $s_1=.090$ | | |
| $L_2$ | $r_3=-2.548$ | $t_2=.275$ | $n_d=1.6725$ | V=32.2 |
| | $r_4=+.997$ | $s_2=.440$ | | |
| $L_3$ | $r_5=+2.548$ | $t_3=.180$ | $n_d=1.6934$ | V=53.5 |
| | $r_6=-2.548$ | | | |

EXAMPLE 2

[Equivalent focal length .704    Aperture f/2.8]

| | | | | |
|---|---|---|---|---|
| $L_1$ | $r_1=+.298$ | $t_1=.156$ | $n_d=1.6934$ | V=53.5 |
| | $r_2=-2.004$ | $s_1=.021$ | | |
| $L_2$ | $r_3=-.584$ | $t_2=.065$ | $n_d=1.6725$ | V=32.2 |
| | $r_4=+.237$ | $s_2=.104$ | | |
| $L_3$ | $r_5=+.599$ | $t_3=.042$ | $n_d=1.6934$ | V=53.5 |
| | $r_6=-.599$ | | | |

EXAMPLE 3

[Equivalent focal length 1.377    Aperture f/3.5]

| | | | | |
|---|---|---|---|---|
| $L_1$ | $r_1=+.580$ | $t_1=.304$ | $n_d=1.6934$ | V=53.3 |
| | $r_2=-3.906$ | $s_1=.041$ | | |
| $L_2$ | $r_3=-1.136$ | $t_2=.127$ | $n_d=1.6725$ | V=32.2 |
| | $r_4=+.462$ | $s_2=.202$ | | |
| $L_3$ | $r_5=+1.172$ | $t_3=.083$ | $n_d=1.6934$ | V=53.5 |
| | $r_6=-1.172$ | | | |

EXAMPLE 4

[Equivalent focal length 1.060    Aperture f/4]

| | | | | |
|---|---|---|---|---|
| $L_1$ | $r_1=+.447$ | $t_1=.234$ | $n_d=1.6934$ | V=53.5 |
| | $r_2=-3.005$ | $s_1=.032$ | | |
| $L_2$ | $r_3=-.873$ | $t_2=.097$ | $n_d=1.6725$ | V=32.2 |
| | $r_4=+.356$ | $s_2=.155$ | | |
| $L_3$ | $r_5=+.9016$ | $t_3=.063$ | $n_d=1.6934$ | V=53.5 |
| | $r_6=-.9016$ | | | |

EXAMPLE 5

[Equivalent focal length 1.06    Aperture f/4]

| | | | | |
|---|---|---|---|---|
| $L_1$ | $r_1=+.378$ | $t_1=.208$ | $n_d=1.6968$ | V=56. |
| | $r_2=\infty$ | $s_1=.030$ | | |
| $L_2$ | $r_3=-.945$ | $t_2=.050$ | $n_d=1.649$ | V=33. |
| | $r_4=+.296$ | $s_2=.150$ | | |
| $L_3$ | $r_5=+.791$ | $t_3=.060$ | $n_d=1.6934$ | V=53.5 |
| | $r_6=-1.011$ | | | |

I have found that the higher order spherical aberration of the front surface $r_1$ of the front component $L_1$ is most effectively cancelled by the higher order of spherical aberration of opposite sign of the rear surface $r_4$ of the middle component $L_2$, and that the higher order coma and astigmatism of the rear surface $r_2$ of the front component $L_1$ is most effectively balanced by the higher order coma and astigmatism of the front surface $r_3$ of the middle component $L_2$. To maintain the proper balance of surface aberration contribution, the thickness of the front and middle components $L_1$ and $L_2$ should be relatively large and the separation of these components should be relatively small, and to effectively balance out the lateral color correction and distortion, the separation of the middle and rear components $L_2$ and $L_3$ should be relatively large, and consequently, contributing to the performance of the objective are the following limitations:

The axial thicknesses of the front and middle components $L_1$ and $L_2$ are respectively from 20 to 25 per cent and from 4 to 12 per cent of the equivalent focal length of the objective, and the axial separations of the front and middle components $L_1$ and $L_2$ are respectively from 2 to 4 per cent and from 12 to 16 per cent of the equivalent focal length of the objective.

Additionally contributing to the performance of the objective are the limitations that the front, middle and rear components $L_1$, $L_2$ and $L_3$ have equivalent focal lengths respectively of substantially 53 per cent, 34 per cent and 62 per cent of the equivalent focal length of the objective, the equivalent focal lengths of the front, middle and rear components of Examples 1 to 4 inclusive being respectively 55 per cent, 34 per cent and 62 per cent and those of Example 5 being respectively 51 per cent, 33 per cent and 61 per cent of the equivalent focal length of the objective.

While I have thus described my invention, I do not wish to be limited to the precise details described, as changes may be readily made without departing from the spirit of my invention.

I claim:

1. An optical objective corrected for spherical and chromatic aberration, coma, astigmatism, field curvature and distortion, comprising three air spaced components of which the front and rear components are positive and the middle component is negative, and further characterized in that the axial thicknesses of the front and middle components are respectively from 20 to 25 per cent and from 4 to 12 per cent of the equivalent focal length of the objective, and that the axial separations of the front and middle components and of the middle and rear components are respectively from 2 to 4 per cent and from 12 to 16 per cent of the equivalent focal length of the objective.

2. An optical objective corrected for spherical and chromatic aberration, coma, astigmatism, field curvature and distortion, as defined in claim 1 and further characterized in that the front, middle and rear components have equivalent focal lengths respectively of substantially 53 per cent, 34 per cent and 62 per cent of the equivalent focal length of the objective.

3. An optical objective corrected for spherical and chromatic aberration, coma, astigmatism, field curvature and distortion, comprising three air spaced simple components, and further characterized in that the axial thicknesses of the front and middle components are respectively from 20 to 25 per cent and from 4 to 12 per cent of the equivalent focal length of the objective, that the axial separations of the front and middle components and of the middle and rear components are respectively from 2 to 4 per cent and from 12 to 16 per cent of the equivalent focal length of the objective, that the front, middle and rear components have equivalent focal lengths respectively of substantially 53 per cent, 34 per cent, and 62 per cent of the equivalent focal length of the objective, and that the front, middle and rear components have refractive indices for the D line respectively in the region of 1.69, 1.66 and 1.69 and have dispersive indices respectively in the region of Abbe number 55, 33 and 53.

4. In an objective corrected for spherical and chromatic aberration, coma, astigmatism, field curvature and distortion, comprising three air spaced simple components, and further characterized in that the axial thicknesses of the front and middle components are respectively from 20 to 25 per cent and from 4 to 12 per cent of the equivalent focal length of the objective, that the axial separations of the front and middle components and of the middle and rear components are respectively from 2 to 4 per cent and from 12 to 16 per cent of the equivalent focal length of the objective, that the front, middle and rear components have equivalent focal lengths respectively of substantially 55 per cent, 34 per cent and 62 per cent of the equivalent focal length of the objective, and that the front, middle and rear components have refractive indices for the D line respectively of substantially 1.6934, 1.6725 and 1.6934 and have dispersive indices respectively of substantially Abbe number 53.5, 32.2 and 53.5.

5. In an optical objective corrected for spherical and chromatic aberration, coma, astigmatism, field curvature and distortion, comprising three air spaced simple components, and further characterized in that the axial thicknesses of the front and middle components are respectively from 20 to 25 per cent and from 4 to 12 per cent of the equivalent focal length of the objective, that the axial separations of the front and middle components and of the middle and rear components are respectively from 2 to 4 per cent and from 12 to 16 per cent of the equivalent focal length of the objective, that the front, middle and rear components have equivalent focal lengths respectively of substantially 51 per cent, 33 per cent and 61 per cent of the equivalent focal length of the objective, and that the front, middle and rear components have refractive indices for the D line respectively of substantially 1.6968, 1.649 and 1.6934 and have dispersive indices respectively of substantially Abbe number 56.2, 33.8 and 53.5.

6. An optical objective corrected for spherical and chromatic aberration, coma, astigmatism, field curvature and distortion, comprising three air spaced simple components, and further characterized in that said objective complies substantially with the following table in which the dimensions are in terms of inches and beginning with the front end of the objective $L_1$ to $L_3$ designate the components, $r_1$ to $r_6$ the radii of curvature of the surfaces, $t_1$ to $t_3$ the axial thicknesses, $s_1$ and $s_2$ the axial separations, $n_d$ the refractive indices for the D line, and V the Abbe dispersion numbers:

| | | | | |
|---|---|---|---|---|
| $L_1$ | $r_1=+1.266$ | $t_1=.622$ | $n_d=1.6934$ | $V=53.5$ |
| | $r_2=-8.506$ | | | |
| | | $s_1=.090$ | | |
| $L_2$ | $r_3=-2.548$ | $t_2=.275$ | $n_d=1.6725$ | $V=32.2$ |
| | $r_4=+.997$ | | | |
| | | $s_2=.440$ | | |
| $L_3$ | $r_5=+2.548$ | $t_3=.180$ | $n_d=1.6934$ | $V=53.5$ |
| | $r_6=-2.548$ | | | |

7. An optical objective corrected for spherical and chromatic aberration, coma, astigmatism, field curvature and distortion, comprising three air spaced simple components, and further characterized in that said objective complies substantially with the following table in which the dimensions are in terms of inches and beginning with the front end of the objective $L_1$ to $L_3$ designate the components, $r_1$ to $r_6$ the radii of curvature of the surfaces, $t_1$ to $t_3$ the axial thicknesses, $s_1$ and $s_2$ the axial separations, $n_d$ the refractive indices for the D line, and V the Abbe dispersion numbers:

| | | | | |
|---|---|---|---|---|
| $L_1$ | $r_1=+.298$ | $t_1=.156$ | $n_d=1.6934$ | $V=53.5$ |
| | $r_2=-2.004$ | | | |
| | | $s_1=.021$ | | |
| $L_2$ | $r_3=-.584$ | $t_2=.065$ | $n_d=1.6725$ | $V=32.2$ |
| | $r_4=+.237$ | | | |
| | | $s_2=.104$ | | |
| $L_3$ | $r_5=+.599$ | $t_3=.042$ | $n_d=1.6934$ | $V=53.5$ |
| | $r_6=-.599$ | | | |

8. An optical objective corrected for spherical and chromatic aberration, coma, astigmatism, field curvature and distortion, comprising three air spaced simple components, and further characterized in that said objective complies substantially with the following table in which the dimensions are in terms of inches and beginning with the front end of the objective $L_1$ to $L_3$ designate the components, $r_1$ to $r_6$ the radii of curvature of the surfaces, $t_1$ to $t_3$ the axial thicknesses, $s_1$ and $s_2$ the axial separations, $n_d$ the refractive indices for the D line, and V the Abbe dispersion numbers:

| | | | | |
|---|---|---|---|---|
| $L_1$ | $r_1=+ .580$ | $t_1=.304$ | $n_d=1.6934$ | $V=53.5$ |
| | $r_2=-3.906$ | $s_1=.041$ | | |
| $L_2$ | $r_3=-1.136$ | $t_2=.127$ | $n_d=1.6725$ | $V=32.3$ |
| | $r_4=+ .462$ | $s_2=.202$ | | |
| $L_3$ | $r_5=+1.172$ | $t_3=.083$ | $n_d=1.6934$ | $V=53.5$ |
| | $r_6=-1.172$ | | | |

9. An optical objective corrected for spherical and chromatic aberration, coma, astigmatism, field curvature and distortion, comprising three air spaced simple components, and further characterized in that said objective complies substantially with the following table in which the dimensions are in terms of inches and beginning with the front end of the objective $L_1$ and $L_3$ designate the components, $r_1$ to $r_6$ the radii of curvature of the surfaces, $t_1$ to $t_3$ the axial thicknesses, $s_1$ and $s_2$ the axial separations, $n_d$ the refractive indices for the D line, and V the Abbe dispersion numbers:

| | | | | |
|---|---|---|---|---|
| $L_1$ | $r_1=+ .447$ | $t_1=.234$ | $n_d=1.6934$ | $V=53.5$ |
| | $r_2=-3.005$ | $s_1=.032$ | | |
| $L_2$ | $r_3=- .873$ | $t_2=.097$ | $n_d=1.6725$ | $V=32.2$ |
| | $r_4=+ .356$ | $s_2=.155$ | | |
| $L_3$ | $r_5=+ .9016$ | $t_3=.063$ | $n_d=1.6934$ | $V=53.5$ |
| | $r_6=- .9016$ | | | |

10. An optical objective corrected for spherical and chromatic aberration, coma, astigmatism, field curvature and distortion, comprising three air spaced simple components, and further characterized in that said objective complies substantially with the following table in which the dimensions are in terms of inches and beginning with the front end of the objective $L_1$ and $L_3$ designate the components, $r_1$ to $r_6$ the radii of curvature of the surfaces, $t_1$ to $t_3$ the axial thicknesses, $s_1$ and $s_2$ the axial separations, $n_d$ the refractive indices for the D line, and V the Abbe dispersion numbers:

| | | | | |
|---|---|---|---|---|
| $L_1$ | $r_1=+ .378$ | $t_1=.208$ | $n_d=1.6968$ | $V=56.2$ |
| | $r_2=\infty$ | $s_1=.030$ | | |
| $L_2$ | $r_3=- .945$ | $t_2=.050$ | $n_d=1.649$ | $V=33.8$ |
| | $r_4=+ .296$ | $s_2=.150$ | | |
| $L_3$ | $r_5=+ .790$ | $t_3=.060$ | $n_d=1.6934$ | $V=53.5$ |
| | $r_6=-1.011$ | | | |

References Cited in the file of this patent

UNITED STATES PATENTS

| | | |
|---|---|---|
| 568,052 | Taylor | Sept. 22, 1896 |
| 1,892,162 | Richter | Dec. 27, 1932 |
| 1,987,878 | Tronnier | Jan. 15, 1935 |
| 2,279,372 | Herzberger | Apr. 14, 1942 |
| 2,503,751 | Litten et al. | Apr. 11, 1950 |

FOREIGN PATENTS

| | | |
|---|---|---|
| 601,649 | Great Britain | May 10, 1948 |